Jan. 4, 1949.  C. E. MEYERHOEFER  2,457,908
COUPLING
Filed July 24, 1947
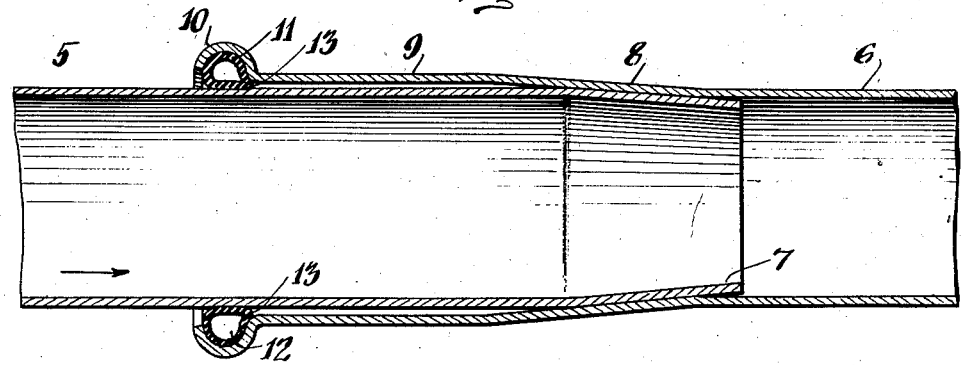
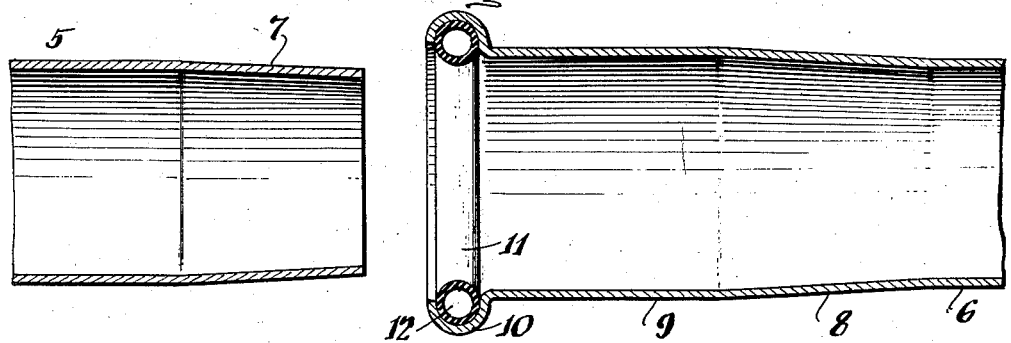
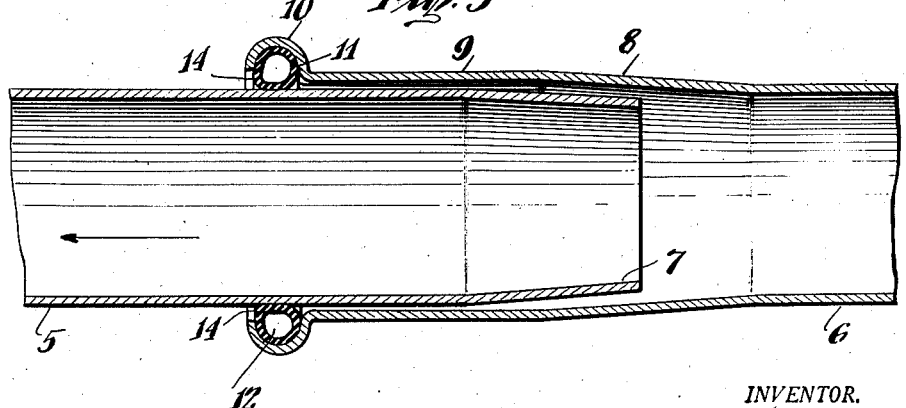
INVENTOR.
Carl E. Meyerhoefer
BY Duell and Kane
ATTORNEYS Patented Jan. 4, 1949

2,457,908

UNITED STATES PATENT OFFICE 2,457,908

COUPLING

Carl E. Meyerhoefer, Brooklyn, N. Y., assignor to Lewyt Corporation, Brooklyn, N. Y., a corporation of New York Application July 24, 1947, Serial No. 763,377

4 Claims. (Cl. 285—163)

This invention relates to an assembly for use with accessory parts of a vacuum cleaner and aims especially to provide a functionally and structurally improved coupling by means of which the operator may readily connect and disconnect the several parts of the assembly.

It is a primary object of the invention to furnish a coupling of the afore indicated type by means of which accessory sections such as wand portions, brushes, nozzles and/or hose ends, etc. may be readily coupled to each other with minimum effort and without any skill being required. When so coupled, substantially air-tight joints will be provided so that leakage will either be completely eliminated or so reduced as to be substantially ineffective.

Also, when so coupled, the operator may employ the various parts without fear that they will either become accidentally detached from each other, or even move with respect to one another to an extent such that substantial air leakage will occur. This will be true even although a maximum working stress may be imposed on the coupling, due to the fact that a major strain is present incident to the use of several accessories and the assembly is being vigorously manipulated.

A further object is that of providing an assembly the parts of which will be capable of being coupled as afore indicated. Additionally, the construction and cooperation of these parts will be such that by deliberate manipulation the operator will have no difficulty in readily effecting a complete separation of the parts. Moreover, both the separation or uncoupling, as well as the coupling, may be achieved without any time-consuming operation being involved.

An additional object is that of providing in a vacuum cleaner assembly a coupling structure which will present a minimum mass or bulk and incorporate a minimum weight; such coupling embodying an extremely simple design which may readily be manufactured largely by automatic methods and when so manufactured will function over long periods of time with freedom from all difficulties.

With these and other objects in mind, reference is had to the attached sheet of drawings illustrating one practical embodiment of the invention and in which:

Fig. 1 is a sectional side view of a pair of wand portions or sections and showing the same in coupled positions;

Fig. 2 is a similar view of these sections detached from each other; and

Fig. 3 is a view similar to Fig. 1 but showing the sections in process of being uncoupled from each other.

In these views, the numeral 5 indicates the body of one wand section and 6 the body of another. At this time it is to be understood that for the sake of simplicity the coupling has been illustrated in connection with merely these sections. As will appear from a reading of the following specification, the coupling might form a part of nozzles, spraying devices, brush sections, hose ends, etc, etc. Therefore, the showing of wand sections is to be taken in an illustrative rather than a limiting sense except where otherwise indicated in the claims.

As shown especially in Fig. 2, the section 5 terminates in a tapered end portion 7 preferably presenting a substantially flat surface. The section 6 has its adjacent end portion flared as indicated at 8 and is continued in the form of a cylindical section 9 of preferably constant diameter.

Sections 5 and 6 are adapted to have their adjacent end portions telescopically disposed. With this in mind, the diameter of body 5 is less than the internal diameter of cylindrical section 9. Also, as shown especially in Fig. 1, the edge defining the point of maximum constriction of the tapered section 7 is of less diameter than the internal diameter of section 6. The angle of flaring throughout zone 8 should be substantially identical with the angle of tapering of end portion 7. Therefore, these portions will lie in face to face contact when the parts are telescopically disposed and projected to their fullest extent.

Adjacent its outer end the cylindrical portion 9 is provided with a groove. This groove is formed by beading or extending the outer edge of the cylindical portion 9 as indicated at 10. A ring 11 is disposed to extend into the groove. This ring has an external diameter such that it snugly engages the inner surface of the groove. In fact, the diameter of the ring may be slightly in excess of the internal diameter of the groove base so that with the ring in position it is placed under slight compression. The depth of the groove may be slightly more than one-half the thickness of the ring so that a major portion of the latter is housed within the groove. This ring is formed of a suitable plastic material having anti-friction qualities. Such material may be virtually any of the vinyl-chloride substances such as polyvinyl chloride. In any event, a resilient material having a low co-efficient of friction and preferably with a polished metal surface should be employed.

If sections—such as wand sections—are to be coupled all that an operator has to do is to introduce the tapered portion 7 into the opening defined by the ring 11. Due to the fact that at its most constricted point the tapered section 7 is substantially smaller in diameter than the internal diameter of the ring, no difficulty will be experienced in this introduction. The ring will only be engaged by the outer surface of the tapered section 7 at a point materially spaced from its edge. This point may conveniently be just in advance of the zone of maximum diameter of portion 7.

Continued inward pressure of sections 5 and 6 with respect to each other will result in the ring 11 being flattened or deformed. This will be especially true because the ring is preferably hollow as indicated at 12. The displacement will, of course, not result in a physical shifting of the ring to a point outside the groove.

Rather, a portion of the ring as indicated at 13 in Fig. 1 will the crowded into the space intervening the outer surface of section 5 and the inner surface of the cylindrical portion 9. This portion may be considered as a pawl or wedging part. As will be appreciated, the portion will resist to a maximum extent any outward movement of section 5 with respect to section 6.

This resistance is sufficient to assure against an accidental separation of these sections even although (in the case of a wand) one section may be vertically below the other and may also have attached to it a brush or other relatively heavy element. In addition, the wedging or pawl portion 13 assures that a fluid-tight seal is provided which will virtually preclude any air leakage occurring through the coupling. Obviously, air leakage is also prevented incident to the major zone of engagement between the ring and face of section 5 in line with the area of the groove.

When it is desired to separate the sections, all that an operator will have to do is to exert pressure in opposite and outward directions on the part of one section with respect to the other. Such pressure will result in the wedging or pawl portion 13 being displaced and in effect absorbed into the body of the ring. Thereafter, and as shown in Fig. 3, a second and somewhat similar portion 14 may be provided as a consequence of the displacement of the parts. It is to be remembered that the ring is preferably of a non-friction material such as a plastic of the type indicated. Therefore, the instant the pawl or wedging portion ceases to exist, the sections 5 and 6 may be moved outwardly with practically no effort. However, effort substantially beyond the strain represented by the use of several accessories which may be supported by the coupling, is necessary in order to shift the sections 5 and 6 outwardly with respect to each other and through their initial zone of movement.

Thus, among others, the several objects of the invention as afore noted are achieved. Obviously numerous changes in construction and rearrangement of the parts might be restored to without departing from the spirit of the invention as defined by the claims.

What I claim is:

1. In a vacuum cleaner assembly a coupling for wand and accessory sections, said coupling including the adjacent ends of tubular sections to be telescopically disposed with respect to each other, the outermost of said sections having an annular groove in its inner face, a flexible ring extending within said groove and having its inner edge defining a circle of less diameter than the innermost section to be embraced thereby, said sections at their adjacent ends presenting reduced and tapered surfaces for contact with each other and the tapered surface of the innermost of said sections presenting an edge portion of less diameter than the internal diameter of the outermost of said sections.

2. In a vacuum cleaner assembly a coupling for wand and accessory sections, said coupling including the adjacent ends of tubular sections to be telescopically disposed with respect to each other, the outermost of said sections having an annular groove in its inner face and adjacent its end, a compressible ring extending into said groove, a cylindrical portion forming a part of the outermost of said sections and disposed inwardly of said groove, a tapered portion connecting said cylindrical portion of the body of said section and a tapered end portion formed at the end of the innermost section, said tapered end portion being adapted to lie in face to face contact with the tapered portion of the outermost section and being also adapted for engagement by said ring.

3. A coupling including a pair of members each comprising cylindrical portions of substantially constant diameter, the end of one member being tapered; the end of the other member comprising a flared part having its reduced end merging into the cylindrical portion of such member, a cylindrical part extending from and merging into the large end of said flared part and a bead defining the outer end of said cylindrical part to provide a circumferentially inwardly extending groove, said members being disposable in telescopic relationship with the tapered end of said one member being in engagement with the inner face of the flared part of the other member to arrest greater telescopic disposition of said members with respect to each other, the cylindrical part and bead of the other member being of greater internal diameter than the outer diameter of the cylindrical portion of said one member and being spaced therefrom, and supporting means disposed within and projecting beyond said bead to yieldingly engage the outer face of the cylindrical portion of said one member and maintain the same parallel to and spaced from the inner face of the cylindrical portion of the other member.

4. A coupling including a pair of members each comprising cylindrical portions of substantially constant diameter, the end of one member being tapered; the end of the other member comprising a flared part having its reduced end merging into the cylindrical portion of such member, a cylindrical part extending from and merging into the large end of said flared part and a bead defining the outer end of said cylindrical part to provide a circumferentially inwardly extending groove, said members being disposable in telescopic relationship with the tapered ends of said one member being in engagement with the inner face of the flared part of the other member to arrest greater telescopic disposition of said members with respect to each other, the cylindrical parts and beads of the other member being of greater internal diameter than the outer diameter of the cylindrical portions of said one member and being spaced therefrom and a ring of resilient material disposed within the groove of said bead and projecting inwardly beyond the same, said material presenting a surface having a low co-efficient friction and said ring yieldingly engaging the outer face of the cylindrical portion of said one member to maintain the same substantially parallel to and spaced from the cylindrical portion of the other member and said ring being distortable to have a part of its body displaceable into the space intervening said cylindrical portions and at a point adjacent said beads.

CARL E. MEYERHOEFER.

REFERENCES CITED

The following references are of record in the file of this patent:

UNITED STATES PATENTS

| Number | Name | Date |
|---|---|---|
| 458,636 | Meilink et al. | Sept. 1, 1891 |
| 668,501 | Davis | Feb. 19, 1901 |
| 1,048,855 | Murdock | Dec. 31, 1912 |
| 2,221,284 | Folsom | Nov. 12, 1940 |